United States Patent [19]
Hart et al.

[11] Patent Number: 5,921,912
[45] Date of Patent: Jul. 13, 1999

[54] COPOLYMER FORMULATIONS FOR BREAKING OIL-AND-WATER EMULSIONS

[75] Inventors: Paul R. Hart, The Woodlands, Tex.; Fu Chen, Newtown, Pa.; Wen P. Liao, Clifton Park, N.Y.; Walter J. Burgess, Phoenixville, Pa.

[73] Assignee: BetzDearborn Inc., Trevose, Pa.

[21] Appl. No.: 09/001,502

[22] Filed: Dec. 31, 1997

[51] Int. Cl.$^6$ ............................... B01D 17/05; C02F 1/00
[52] U.S. Cl. .......................... 516/176; 210/708; 516/169; 516/180
[58] Field of Search ................ 252/341, 358; 210/708; 516/169, 176, 180

[56] References Cited

U.S. PATENT DOCUMENTS

| | | | |
|---|---|---|---|
| 2,679,485 | 5/1954 | De Groote | 252/341 X |
| 4,454,047 | 6/1984 | Becker et al. | 252/358 X |
| 4,588,508 | 5/1986 | Allenson et al. | 210/708 |
| 4,734,205 | 3/1988 | Jacques et al. | 252/341 X |
| 4,741,835 | 5/1988 | Jacques et al. | 252/358 X |
| 5,021,167 | 6/1991 | Braden et al. | 210/708 |
| 5,102,580 | 4/1992 | Toenjes et al. | 252/358 X |
| 5,236,591 | 8/1993 | Hart | 210/639 |
| 5,256,305 | 10/1993 | Hart | 210/708 |
| 5,294,347 | 3/1994 | Byrne et al. | 210/708 |
| 5,332,507 | 7/1994 | Braden et al. | 210/708 |
| 5,607,574 | 3/1997 | Hart | 208/188 |
| 5,614,101 | 3/1997 | DeWalls et al. | 210/708 |
| 5,614,602 | 3/1997 | Connors et al. | 526/307.3 |
| 5,635,112 | 6/1997 | Ramesh et al. | 252/358 X |

*Primary Examiner*—Richard D. Lovering
*Attorney, Agent, or Firm*—Steven D. Boyd

[57] ABSTRACT

A method of breaking oil-in-water and water-in-oil emulsions in crude oil processing systems in which copolymers incorporating a hydrophilic cationic monomer subunit and a lipophilic nonionic monomer subunit or dispersions or emulsions of cationic polymers and obverse demulsifiers are employed.

20 Claims, No Drawings

COPOLMER FORMULATIONS FOR BREAKING OIL-AND-WATER EMULSIONS

FIELD OF THE INVENTION

The present invention relates to a process of breaking oil-and-water emulsions. More particularly, the present invention relates to an improved method of breaking emulsions in a crude oil desalting system.

BACKGROUND OF THE INVENTION

All crude oil contains impurities which contribute to corrosion, heat exchanger fouling, furnace coking, catalyst deactivation and product degradation in refinery and other processes. These contaminants are broadly classified as salts, bottom sediment and water, solids, and metals. The amounts of these impurities vary depending upon the particular crude. Generally, crude oil salt content ranges between about 3 and 200 lb. per 1000 barrels of crude oil.

Brines present in crude include predominantly sodium chloride with lesser amounts of magnesium chloride and calcium chloride being present. Chloride salts are the source of highly corrosive HCl which is severely damaging to refinery tower trays, and other equipment. Additionally, carbonate and sulfate salts may be present in crude oil in sufficient quantities to promote crude preheat exchanger scaling.

Desalting is, as the name implies, adapted to remove primarily inorganic salts from the crude oil prior to refining. The desalting step is provided by adding and mixing (typically in a desalter mix valve) with the crude oil a few volume percentages of fresh water to contact the brine and salts present in the crude oil.

In crude oil desalting, a water-in-oil emulsion is intentionally formed with the water admitted being on the order of about 2 to 10 volume percent based upon crude oil. Water is added to the crude oil and mixed intimately to transfer impurities in the crude oil to the water phase. Separation of the phases occurs due to coalescence of small water droplets into progressively larger droplets. Eventually gravity separation of the oil and an underlying water phase occurs.

Desalters are also commonly provided with electrodes to impart an alternating electrical field in the desalter. This serves to polarize the dispersed water droplets. The so-formed dipole droplets exert an attractive force between oppositely charged poles with the increased attractive force increasing the speed of water droplet coalescence by from 10 to 100 fold. The water droplets also elongate quickly in the electrical field thus creating fresh interface that further enhances coalescence.

Upon separation of the phases from the water-in-oil (or obverse) emulsion, the crude oil is commonly drawn off the top of the desalter and sent to the fractionator tower in crude units or other refinery processes. The water phase containing water-soluble metal salt compounds and sediment is removed as effluent brine which is discharged.

Emulsion breakers for water-in-oil emulsions, also called regular, primary, or obverse demulsifiers or breakers, are fed to the desalter unit to modify the stabilizer film formed initially at the oil/water interface. These obverse breakers are typically oil soluble surfactants that migrate to the interface allowing droplets of water (or oil) to coalesce more readily. Demulsifier formulations sometimes include ingredients (obverse emulsifiers) to help in providing maximum mixing of the oil and water phases in the desalter, in addition to a demulsifier which reduces the residence time required for good separation of oil and water in the unit.

Typical oil-based, obverse demulsifier components employed in crude oil desalting include alkoxylates of either alkylphenols, alkylamines, alcohols, or polyetherols any of which with or without crosslinking with aldehydes, or di- or multifunctional species comprising acids, epoxides, isocyanates, or the like. The "monomeric" species (those with single, hydrophilic heads groups, such as the ethoxylates of alkylphenols or alcohols) are included as emulsifiers only (to help dissolve the salts) and are not used alone or above a tiny fraction (1–2%) of the formulation.

The water phase removed from the desalter (the effluent brine) may also contain contaminating oil in a form of oil-in-water emulsions which makes disposal of the water difficult. These oil-in-water (or reverse) emulsions can form at the desalter mix valve and remain unresolved as the water droplets coalesce and/or they can form by inversion of the coagulated water-in-oil emulsion to a water continuous form at the mid-vessel emulsion "cuff". In either case, these emulsions occur at elevated process temperatures (65 to 150° C.) and in the presence of a majority of bulk oil (50–98%).

Flocculant or coagulant type oil-in-water demulsification agents, also called reverse breakers, are sometimes used to break the emulsions downstream, where the emulsion has cooled and been separated from the bulk oil phase. These agents include cationic colloidal inorganic salts, such as those of Al, Fe, and Zn, and cationic organic polymers, such as polyamine condensates, polyvinylamines, polyaminoacrylates and the like. Except for certain subclasses, these are not fed, and do not work well when they are fed, to the desalter influent wash water. Particular types that have been found to be effective when so fed to a desalter are described in U.S. Pat. No. 5,607,574.

Typical water-based, reverse demulsifier components for desalters include alkanolamine condensates, polydiallyldimethylammonium chloride, copolymers of acryl or methacryl amido or oxy alkyl trimethyl, or dimethylbenzyl, ammonium chloride and acrylamide, and cationic colloidal salts of Fe, Zn, and Al. The inorganic species are included to "desolubilize" microemulsified oil and do not actually resolve emulsions alone.

SUMMARY OF THE INVENTION

The present inventors have found that copolymers incorporating a hydrophilic cationic monomer subunit and a lipophilic nonionic monomer subunit are effective emulsion breakers for reverse (oil-in-water) and obverse (water-in-oil) emulsions. They have also found that obverse demulsifiers can be used to create stable emulsions or dispersions of reverse demulsifiers in oily or aqueous media, thereby consolidating both obverse and reverse treatments into one.

DESCRIPTION OF THE PREFERRED EMBODIMENTS

The method of the present invention provides for the improved separation of water and oil in oil production and processing operations. The method of the present invention comprises treating a system containing oil and water, where emulsions form, with a copolymer solution or copolymer/surfactant dispersion or emulsion. The copolymer containing treatments of the present invention were found to be effective treatments for resolving (breaking or inhibiting) oil-in-water (reverse) and water-in-oil (obverse) emulsions in petroleum refinery desalters. The specific construction details of the desalter are not important to the present invention. However, it is noted that ordinarily, desalters are provided with electrodes to impart an electric field to the emulsion formed in the desalter to aid in coalescence of the water droplets to facilitate resolution of the emulsion. An effective emulsion breaker must be compatible with the electrorheological stress induced in such systems.

The inventors of the present invention discovered that the addition of a treatment comprising a copolymer of a hydrophilic cationic monomer subunit and a lipophilic nonionic monomer subunit is effective at breaking or inhibiting emulsions (both reverse and obverse) in crude oil desalter operations. The lipophilic nonionic monomer subunits of the present invention are more lipophilic than the acrylamide which is present in known emulsion breakers.

The copolymers of the present invention are prepared by solution, emulsion, or dispersion polymerization techniques. The copolymers comprise a cationic monomer subunit and a nonionic lipophilic monomer subunit.

The cationic monomer subunit has the general structure

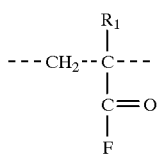

wherein F is a salt of an ammonium cation such as $NHR_1N^+R_{(2,3,4)}X^-$ or $OR_1N^+R_{(2,3,4)}X^-$, wherein $R_1$ is a $C_1$ to $C_4$ linear or branched alkylene group, $R_2$, $R_3$ and $R_4$ can be selected from the group consisting of $C_1$ to $C_{16}$ linear or branched alkyl, $C_7$ to $C_{16}$ cycloalkyl, aromatic or alkylaromatic group provided the total of $R_2$, $R_3$ and $R_4$ is less than about $C_{20}$; and X is an anion such as chloride, bromide, or methyl or hydrogen sulfate. Typical cationic monomer subunits include 2-acryloyloxyethyltrimethyl ammonium chloride (AETAC), 2-methacryloyloxyethyltrimethyl ammonium chloride (METAC), 3-methacrylamidopropyltrimethyl ammonium chloride (MAPTAC), diallyldimethyl ammonium chloride (DADMAC), acryloyloxyethyldimethylbenzyl ammonium chloride (AEDBAC), methacryloyloxyethyldimethylbenzyl ammonium chloride (MEDBAC), acrylamidopropyltrimethyl ammonium chloride (APTAC). Replacing the cationic acrylic monomer with N-substituted vinyl pyridinium chloride, where the substituent is as defined for $R_2$, $R_3$ and $R_4$ above, is within the scope of the present invention. Replacing chloride with methyl sulfate in the above monomers is also within the scope of the present invention. Terpolymers of the above monomer subunits in combination with acrylamide, methacrylamide, or acrylic acid are also contemplated as within the scope of the present invention.

The lipophilic, nonionic monomer subunit can be selected from the group: methylacrylate, ethylacrylate, butylacrylate, 2-ethylhexylacrylate, hydroxyethylacrylate, hydroxypropylacrylate, N-isopropylacrylamide, N,N-dimethylacrylamide and vinyl methyl ether. By lipophilic, it is meant that the nonionic monomer unit is more lipophilic than acrylamide or methacrylamide. Acrylamide is usually employed as a subunit of an emulsion breaker copolymer.

In the copolymer of the present invention the cationic monomer subunit can comprise from about 1.0% to 90% by moles of the copolymer. Preferably the cationic monomer subunit comprises from about 40% to 80% by moles of the copolymer. The molecular weight of the copolymer can range from about 20,000 to 20,000,000 daltons and preferably ranges from about 200,000 to 20,000,000 daltons. The polymers can be prepared using solution, emulsion, dispersion, suspension or other polymerization methods that are familiar to a person skilled in the art.

In addition, the inventors found that reverse breakers, preferably of the above type, can be stably dispersed in aqueous or oily media using obverse breakers as the sole or co-surfactant. The obverse breakers are added in the range of 3% to 30% of the dispersion.

The aqueous media can be water or brine, depending on the hydrophilicity of the polymer and the presence of any added oil, with increasingly stronger brine or greater addition of oil required for increasingly hydrophilic (such as acrylamide based) polymers. The oily medium can be the standard paraffinic mineral oil used in standard water-in-oil (inverse) emulsion polymers.

The obverse demulsifier used to disperse the reverse breakers in water or emulsify them in oil can include alkoxylates of either alkylphenol-formaldehyde resins, alkylamines, or polyetherols with or without crosslinking with di- or multi-functional acids, epoxides or isocyanates. The preferred demulsifiers are ethoxylates of either butyl or nonyl phenol-formaldehyde resins, fatty quaternary amines, or poly(propylene oxide) diols or triols, the diol preferably crosslinked with the diglycidyl epoxide of 2,2-bisphenol propane.

When reverse breakers are made as aqueous dispersions, approximately equal amounts of reverse breaker and obverse breaker are employed. When reverse breakers are made as inverse, oil continuous phase emulsions, from one to ten parts reverse breaker for every part obverse breaker is employed.

The copolymer containing products of the present invention are preferably added to the influent wash water fed to a desalter or to the aqueous or emulsion layer in a desalter, vessel (e.g., via the mud wash header) at a rate from about 1.0 to 500 parts active polymer per million parts of the water or about 0.02 to 50 parts active polymer per million parts of crude oil charge.

The efficacy of the emulsion breaking copolymer containing products of the present invention will be dependent upon a number of factors such as the properties of the crude oil being desalted, the mixer type, and the design and operating conditions of the desalter unit. The most effective product for a particular desalter and crude oil feed may be easily determined by a person skilled in the art through a test tube scale evaluation as described below.

One method of bench testing the reverse/obverse emulsion breakers of the present invention to determine the preferred breaker for a specific application is as follows. The treatment to be tested is added to a reverse emulsion sampled without shear from a desalter unit. This is mixed at a temperature and with a shear and duration approximating that of the desalter mix valve. The reverse emulsion is allowed to settle at a temperature and electric field strength and for a residence time approximating that of the desalter. The oil/water/treatment ratio is maintained as it would exist in the desalter system where the treatment will be used. The amount of oil which rises out of the emulsion and the clarity of the water as a function of time is recorded.

Alternately, the reverse of the desalter systems influent oil/water ratio may be used to simulate a small portion of the oil emulsifying into the more turbulent water at or before the mix valve.

The demulsifier treatment with the fastest and most complete oil rise is selected as the preferred treatment for the particular reverse emulsion in the desalter unit after which the test was modeled.

In addition, it is necessary to perform a standard water-in-oil test modeling the overall phase ratio, temperature, pressure, shear, electric field strength, and phase residence times of the desalter with the reverse/obverse breaker added to the water phase. This test evaluates whether the breaker will accelerate or retard the resolution of the water-in-oil, or obverse, emulsion, preferably with the presence in the oil of the obverse breaker to be employed. The rate at which emulsified water drops to the bottom of the tube is measured. From this test, the most efficacious overall reverse/obverse breaker treatment for the given crude oil and desalter system is selected.

EXAMPLES

The following examples are intended to show the efficacy of the present invention as a breaker for reverse and obverse emulsions. They are not intended to limit the scope of the invention or manner in which it is practiced. Table I describes the treatments tested in the examples.

TABLE I

| Treatment | Monomers | Method of Preparation | Monomer Ratio |
|---|---|---|---|
| A | HPA:AETAC | emulsion polymer[1] | 60:40 mole ratio |
| B | HPA:AETAC | emulsion polymer[1] | 50:50 mole ratio |
| C | HPA:AETAC | emulsion polymer[1] | 40:60 mole ratio |
| D | HPA:AETAC | emulsion polymer[1] | 30:70 mole ratio |
| E | HPA:AETAC | emulsion polymer[1] | 20:80 mole ratio |
| F | HPA:AETAC | solution polymer | 50:50 mole ratio |
| G | HPA:AETAC | solution polymer | 70:30 mole ratio |
| H | HPA:AETAC:AA | solution polymer | 56:33:11 mole ratio |
| I | EHA:MAPTAC | dispersion polymer[2] | 45:55 mole ratio |
| J | EHA:MAPTAC | dispersion polymer[2] | 45:55 mole ratio |
| K | EHA:AETAC | dispersion polymer[2] | 45:55 mole ratio |
| L | BA:AETAC | dispersion polymer[3] | 60:40 mole ratio |
| M | BA:AETAC | dispersion polymer[3] | 70:30 mole ratio |
| N | EHA:APTAC | dispersion polymer[2] | 45:55 mole ratio |
| O | EHA:MAPTAC | dispersion polymer[2] | 50:50 mole ratio |
| P | EHA:MAPTAC | dispersion polymer[2] | 30:70 mole ratio |
| Q | HPA:AETAC | emulsion polymer[1] | 30:70 mole ratio |
| R | HPA:AETAC | emulsion polymer[1] | 30:70 mole ratio |

HPA = hydroxypropyl acrylate
EHA = 2-ethylhexyl acrylate
BA = n-butyl acrylate
AA = acrylic acid
AETAC = acryloyloxyethyltrimethyl ammonium chloride
MAPTAC = methacrylamidopropyltrimethyl ammonium chloride
APTAC = acrylamidopropyltrimethyl ammonium chloride
[1] Copolymers A–E are emulsified with 2.4–3.2% of a $C_{12-15}$ alcohol nona-ethoxylate and 0.6–0.8% of a dioctyl sodium sulfosuccinate emulsifers. Copolymer Q is emulsified with 3–4% of a nonylphenol deca-ethoxylate emulsifier. Copolymer R is emulsified with 3–4% of a nonylphenol-formaldehyde resin penta-ethoxyate demulsifier.
[2] Copolymer I is dispersed in water through the addition of 12% of a nonylphenol deca-ethoxylate emulsifier. Copolymers J, K, N, O, and P are dispersed in water through the addition of 12–21% of a nonylphenol-formaldehyde resin penta-ethoxylate demulsifier.
[3] Copolymers L and M are dispersed in a brine of ammonium sulfate without the use of emulsifiers.

Within the scope of the present invention: "emulsion polymer" refers to monomers polymerized and contained in a water-in-oil, or inverse, emulsion. Such polymers typically have a molecular weight from about 2,000,000 to 20,000,000; "dispersion polymer" refers to monomers polymerized and contained in an oil-in-aqueous (water or brine) or hydrophobic monomer-in-aqueous (water or brine) emulsion or dispersion. Such polymers typically have a molecular weight from about 20,000 to 20,000,000; "solution polymer" refers to monomers polymerized and contained in aqueous (water or brine) solution. Such polymers typically have a molecular weight from about 20,000 to 200,000.

The materials to be tested were dissolved in an aqueous test solution and added to an oil-in-water emulsion taken from or made from the oil and water fed to the desalter to be treated. The concentration of the test solution was 0.3% active in an aqueous emulsion breaker solvent. The aqueous emulsion breaker solvent was 1% hexyleneglycol in deionized water. The treated desalter emulsion was heated to the desalter temperature and mixed. An electric field was turned on and demulsification activity occurred. The water clarity (WC on the Colonial Pipeline scale of 1=clear to 6=opaque) and oil rise (OR, the amount of non-emulsified oil at the top of the test tube to the nearest 0.1 mL) was recorded periodically for up to 30 minutes.

Table II summarizes the results of testing at 300° F. the treatments outlined in Table I on a 5% oil-in-water emulsion taken from a desalter processing on-shore and off-shore Californian crude oil. As can be seen from Table II, for this particular crude oil being tested, the most efficacious emulsion breaker was D, I, or J. For a different oil, and conditions of temperature, extent of mixing, ratio of oil to water, and contaminants present, it is expected that other combinations within the scope of the present invention could be preferred.

TABLE II

| Treatment | | Water Clarity Reading | | | |
|---|---|---|---|---|---|
| Breaker | ppm active | (in Colonial Pipeline units) | | | |
| | | 5 min. | 10 min. | 15 min. | 30 min. |
| A | 15 | Cloudy 4 | Sl. Cl. 3 | Sl. Cl. 3 | Sl. Cl. 2.5 |
| B | 15 | Cloudy 4 | Sl. Cl. 3 | Sl. Cl. 3 | Sl. Cl. 2.5 |
| C | 15 | Cloudy 4 | Sl. Cl. 3 | Sl. Cl. 3 | Sl. Cl. 2.5 |
| D | 15 | Sl. Cl. 3 | Al. Cr. 2 | Al. Cr. 2 | Al. Cr. 2 |
| E | 15 | Cloudy 4 | Sl. Cl. 3 | Cloudy 3 | Sl. Cl. 2.5 |
| F | 15 | Brown 6 | Brown 6 | Brown 6 | Brown 6 |
| G | 15 | Brown 6 | Brown 6 | Brown 6 | Brown 6 |
| H | 15 | Brown 6 | Brown 6 | Brown 6 | Brown 6 |
| I | 15 | Sl. Cl. 3 | Al. Cr. 2 | Al. Cr 2 | Clear 1.5 |
| J | 15 | Sl. Cl. 3 | Al. Cr. 2 | Al. Cr. 2 | Clear 1.5 |
| K | 15 | Brown 6 | Brown 6 | Brown 6 | Brown 6 |
| L | 15 | Brown 5 | Brown 5 | Brown 5 | Cl. 4 |
| M | 15 | Brown 5 | Brown 5 | Brown 5 | Cl. 4 |
| Control | 0 | Brown 6 | Brown 6 | Brown 6 | Brown 6 |

Al. Cr. = Almost clear
Sl. Cl. = Slightly cloudy
Cl. = Cloudy

Table III summarizes the results of testing on a 9% oil-in-water emulsion made from a different heavy California crude. The test procedure involved adding the treatment to an emulsion at 200° F., mixing, heating to 290° F., mixing and observing after 30 minutes at 290° F.

TABLE III

| Treatment | | Water Clarity Reading (in Colonial Pipeline units) |
|---|---|---|
| Breaker | ppm active | 30 min. |
| D | 15 | 1.5–2 |
| N | 15 | 3 |
| O | 15 | 1 |
| I | 15 | 2 |
| J | 15 | 1 |
| P | 15 | 3 |
| Q | 15 | 2 |
| R | 15 | 1.5 |
| Control | 0 | 6 |

Table IV summarizes the results of testing on a 5% oil-in-water emulsion of a heavy Canadian crude and desalter wastewater. The test procedure was as in Table III except that the final temperature was 280° F.

TABLE IV

| Treatment | | Water Clarity Reading (in Colonial Pipeline units) |
|---|---|---|
| Breaker | ppm active | 30 min. |
| D | 15 | 1 |
| N | 15 | 4 |
| O | 15 | 4 |
| I | 15 | 2 |
| J | 15 | 3–4 |
| P | 15 | 4 |
| Q | 15 | 1.5–2 |
| R | 15 | 1 |
| Control | 0 | 6 |

The data in Tables II–IV shows that the preferred treatment of the present invention varies from one type of crude oil to the next but in general the formulations of the present invention are effective at breaking reverse emulsions.

Table V summarizes testing, on a California crude, of the polymer formulations of the present invention in a 9% water-in-oil emulsion having the obverse emulsion breaker butylphenol-formaldehyde resin tri-ethoxylate present in the oil at 6.8 ppm active (based on emulsion). The test procedure involved observing the rate at which emulsified water drops to the bottom of the tube. In the table the result reported is the mean of readings at 1, 2, 4, 8, 16, 32 and 64 minutes. A difference in this mean of 0.1 mL is physically and statistically significant at the 95% confidence level.

TABLE V

| Water Treatment | | |
|---|---|---|
| Breaker | ppm active | Water Drop in Milliliters |
| D | 1.35 | 6.66 |
| I | 1.35 | 6.71 |
| J | 1.35 | 6.67–6.79 |
| R | 1.35 | 6.53 |
| Control (obverse only) | 0 | 6.53 |

Table VI summarizes testing, on a Canadian crude, of the polymers of the present invention in a 5% water-in-oil emulsion having as an obverse emulsion breaker a butylphenol-formaldehyde resin tri-ethoxylate present in the oil at 5.4 ppm active (based on emulsion). The test procedure was as described above for Table V except at 285° F.

TABLE VI

| Water Treatment | | |
|---|---|---|
| Breaker | ppm active | Water Drop in Milliliters |
| D | 0.75 | 3.94 |
| I | 0.75 | 3.87 |
| J | 0.75 | 3.77–3.81 |
| R | 0.75 | 3.96 |
| Control (obverse only) | 0 | 3.56 |

To illustrate the advantages of replacing emulsifying surfactants with demulsifying surfactants in two-phase (emulsion or dispersion) polymers of the prior art, a test was run on a produced emulsion of California crude using the standard emulsion polymer then in use, a 40% AETAC:60% AM copolymer, emulsified with various blends of traditional emulsifying and the demulsifying surfactants of the present invention. The compositions of the surfactant packages are shown in Table VII.

TABLE VII

| Formulation | Wt. % Emulsifier[1] | Wt. % Demulsifier[2] |
|---|---|---|
| S | 2 | 20 |
| T | 3 | 20 |
| U | 4 | 20 |
| V | 2 | 10 |
| W | 3 | 10 |
| X | 4 | 10 |

[1]Emulsifier comprises 80% of a $C_{12-15}$ alcohol nona-ethoxylate and 20% of a dioctyl sodium sulfosuccinate.
[2]Obverse demulsifier, comprises an ethoxylate of a polyisopropylether diol crosslinked with the di(glycidyl epoxide) of 2,2-bisphenol propane.

The produced emulsion on which these were tested comprised commingled reverse and obverse emulsions. The obverse emulsion contained 45% water and the reverse emulsion contained 2% oil.

The test employed the same conditions and fluid ratios as existed at the oilfield treatment facility. This consisted of a Free Water Knock Out in series with a Heater Treater, an arrangement similar to a two-stage desalter but without the added water wash, the mix valve, and the electric field. The following procedure was used:

Sixty (60) mL reverse emulsion was added to a 250 mL glass pressure vessel. The reverse breaker, and the proportion of the obverse breaker corresponding to the oil in the reverse emulsion, was added to the reverse emulsion with gentle mixing. One hundred (100) mL obverse emulsion was then added. The obverse breaker was added to the obverse emulsion with gentle mixing. The vessel was sealed, heated to 176° F., then shaken 22 minutes at 4 cps in a thermally insulated, long throw, reciprocal shaker. Water level and clarity readings were taken at 10, 20, 40, 80, and 160 minutes. The free water was removed and the vessels reshaken for 75 seconds, then heated to 240° F. Water level and clarity readings were taken at 15, 30, 45, 90, 180, and 360 minutes.

The results are shown in Table VIII.

TABLE VIII

| Formu- lation | ppm Act. Copolymer[1] | 176° F. Bath 40 Min. Reading | | 240° F. Bath 90 Min. Reading | |
|---|---|---|---|---|---|
| | | WD, mL[2] | WC, CP[3] | WD, mL | WC, CP |
| S | 2.6 | 30 | 2 | 30 | 1 |
| T | 2.6 | 20 | 2 | 25 | 1 |
| U | 2.6 | 20 | 4 | 25 | 3 |
| V | 5.2 | 35 | 2 | 25 | 1 |
| W | 5.2 | 25 | 2 | 20 | 1 |
| X | 5.2 | 5 | 2 | 10 | 1 |

[1]Dosage per total emulsion of active AETAC:AM reverse breaker added to reverse emulsion with surfactant package. In addition, an ethoxylate of a polyisppropylether diol crosslinked with the di(glycidyl epoxide) of 2,2-bisphenol propane was added to the obverse emulsion at an active dosage per total emulsion of 12 ppm minus the amount put in with the RB surfactant package (i.e. 12 ppm total for all).
[2]Water Drop in mL.
[3]Water Clarity in Colonial Pipeline units.

The results in Table VIII demonstrate that the surfactant package which provided the best overall reverse and obverse breaking performance is the one with the least amount of emulsifying surfactant and the most relative amount of demulsifying surfactant.

While the present invention has been described with respect to particular embodiments thereof, it is apparent that other forms and modifications of this invention will be obvious to those skilled in the art. The appended claims and this invention generally should be construed to cover all such obvious forms and modifications which are within the true spirit and scope of the present invention.

What is claimed is:

1. A method of resolving oil-in-water and water-in-oil emulsions in crude oil production and processing systems comprising adding to the aqueous phase of said systems a copolymer treatment effective for the purpose, in an amount effective for resolving said emulsions, said copolymer comprising a hydrophilic cationic monomer subunit selected from the group consisting of acryloyloxyethyltrimethyl ammonium chloride, and methacrylamidopropyltrimethyl ammonium chloride and a lipophilic, nonionic monomer subunit selected from the group consisting of 2-ethylhexyl-acrylate, and hydroxypropylacrylate.

2. The method of claim 1 wherein said hydrophilic cationic monomer subunit comprises from about 1.0% to about 90% by moles of said copolymer treatment.

3. The method of claim 1 wherein the molecular weight of said copolymer treatment is from about 20,000 to about 20,000,000.

4. The method of claim 1 wherein said copolymer treatment is a solution having a copolymer concentration of from about 0.1% to about 50% actives in an aqueous solvent.

5. The method of claim 1 wherein said copolymer treatment is an emulsion of an aqueous medium in oil having a copolymer concentration of from about 1.0% to about 50%.

6. The method of claim 5 wherein said emulsion of an aqueous medium in oil is made with an effective emulsifying amount of an obverse demulsifier.

7. The method of claim 6 wherein said effective emulsifying amount of obverse demulsifier comprises between about 3% and 30% of the emulsion.

8. The method of claim 6 wherein said obverse demulsifier comprises: alkoxylates of either alkylphenol-formaldehyde resins, alkylamines, or polyetherols, any of which with or without crosslinking with di- or multi-functional species comprising acids, epoxides, and isocyanates.

9. The method of claim 1 wherein said copolymer treatment is a dispersion having a copolymer concentration of from about 0.1% to about 50% in an aqueous medium.

10. The method of claim 9 wherein said aqueous dispersion is formed through the interaction of said copolymer and an effective dispersing amount of an obverse demulsifier.

11. The method of claim 10 wherein said effective dispersing amount of obverse demulsifier comprises between about 3% and 30% of the dispersion.

12. The method of claim 10 wherein said obverse demulsifier comprises: alkoxylates of either alkylphenol-formaldehyde resins, alkylamines, or polyetherols, any of which with or without crosslinking with di- or multi-functional species comprising acids, epoxides, and isocyanates.

13. The method of claim 1 wherein said copolymer treatment is selected from the group consisting of copolymers of about 40 to 70% methacrylamidopropyltrimethyl ammonium chloride and 30 to 60% 2-ethylhexyl acrylate.

14. The method of claim 1 wherein said copolymer is selected from the group consisting of copolymers of about 40% to 80% acryloyloxyethyltrimethyl ammonium chloride and 20% to 60% hydroxypropyl acrylate with a molecular weight from about 200,000 to 20,000,000.

15. The method of claim 1 wherein said copolymer treatment is added to the aqueous phase of said systems emulsified into an immiscible oily medium using an effective emulsifying amount of an obverse demulsifier.

16. The method of claim 15 wherein said effective emulsifying amount of obverse demulsifier comprises between about 3% and 30% of the emulsion.

17. The method of claim 15 wherein said obverse demulsifier comprises: alkoxylates of either alkylphenol-formaldehyde resins, alkylamines, or polyetherols, any of which with or without crosslinking with di- or multi-functional species comprising acids, epoxides, and isocyanates.

18. The method of claim 1 wherein said copolymer treatment is added to the aqueous phase of said systems dispersed into an immiscible aqueous (water or brine) medium using an effective dispersing amount of an obverse demulsifier.

19. The method of claim 18 wherein said effective dispersing amount of obverse demulsifier comprises between about 3% and 30% of the dispersion.

20. The method of claim 18 wherein said obverse demulsifier comprises: alkoxylates of either alkylphenol-formaldehyde resins, alkylamines, or polyetherols, any of which with or without crosslinking with di- or multi-functional species comprising acids, epoxides, and isocyanates.

* * * * *